US010640004B2

(12) United States Patent
Patel

(10) Patent No.: US 10,640,004 B2
(45) Date of Patent: May 5, 2020

(54) SYSTEMS AND METHODS FOR CHARGING AND WARMING VEHICLE COMPONENTS

(71) Applicant: Toyota Motor Engineering & Manufacturing North America, Inc., Erlanger, KY (US)

(72) Inventor: Tapan V. Patel, Lakewood, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 796 days.

(21) Appl. No.: 15/011,303

(22) Filed: Jan. 29, 2016

(65) Prior Publication Data
US 2017/0217328 A1 Aug. 3, 2017

(51) Int. Cl.
*B60L 11/18* (2006.01)
*B60L 3/00* (2019.01)
(Continued)

(52) U.S. Cl.
CPC ............ *B60L 11/1875* (2013.01); *B60K 1/04* (2013.01); *B60L 50/15* (2019.02); *B60L 53/14* (2019.02); *B60L 58/12* (2019.02); *B60L 58/27* (2019.02); *F02N 19/02* (2013.01); *B60K 2001/008* (2013.01); *B60L 2240/36* (2013.01); *B60L 2240/425* (2013.01); *B60L 2240/445* (2013.01); *B60L 2240/485* (2013.01);
(Continued)

(58) Field of Classification Search
CPC ..... B60K 1/04; B60K 2001/008; B60L 11/12; B60L 11/1816; B60L 11/1861; B60L 11/1875; B60L 2240/36; B60L 2240/425; B60L 2240/445; B60L 2240/485; B60L 2240/545; B60L 2240/70; B60L 2240/80; B60L 2260/56; B60L 2260/58; B60Y 2400/302; F02N 19/02
USPC ..... 219/202–205, 481; 701/22, 36; 320/150; 237/28, 81
See application file for complete search history.

(56) References Cited

U.S. PATENT DOCUMENTS 5,115,116 A 5/1992 Reed
5,285,963 A 2/1994 Wakefield et al.
(Continued)

FOREIGN PATENT DOCUMENTS

WO  WO 2011/104422  9/2011
WO  WO 2015/114434  8/2015

*Primary Examiner* — Tu B Hoang
*Assistant Examiner* — Vy T Nguyen
(74) *Attorney, Agent, or Firm* — Snell & Wilmer LLP

(57) ABSTRACT

A system includes an on-board charger that receives energy from an external power source and a battery having a state of charge (SOC) and a battery temperature. The system also includes a battery heater that converts electrical energy into thermal energy (heat) for increasing the battery temperature. The system also includes a battery management system (BMS) that determines or detects a current SOC of the battery and a current battery temperature. The system also includes an electronic control unit (ECU) coupled to the on-board charger and to the BMS. The ECU controls the on-board charger to distribute energy to the battery and to the battery heater to cause the SOC to remain above a SOC threshold and to cause the battery temperature to remain above a battery temperature threshold based on the current SOC and the current battery temperature.

19 Claims, 5 Drawing Sheets

(51) Int. Cl.
*B60K 1/04* (2019.01)
*F02N 19/02* (2010.01)
*B60L 58/27* (2019.01)
*B60L 58/12* (2019.01)
*B60L 53/14* (2019.01)
*B60L 50/15* (2019.01)
*B60K 1/00* (2006.01)

(52) U.S. Cl.
CPC ..... *B60L 2240/545* (2013.01); *B60L 2240/70* (2013.01); *B60L 2240/80* (2013.01); *B60L 2260/56* (2013.01); *B60L 2260/58* (2013.01); *B60Y 2400/302* (2013.01); *Y02T 10/642* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7291* (2013.01); *Y02T 90/14* (2013.01); *Y02T 90/16* (2013.01)

(56) References Cited

U.S. PATENT DOCUMENTS

| | | | |
|---|---|---|---|
| 6,892,541 | B2 | 5/2005 | Suzuki |
| 7,715,957 | B2 | 5/2010 | Yamaguchi et al. |
| 7,769,505 | B2 | 8/2010 | Rask et al. |
| 8,473,177 | B2 | 6/2013 | Kumar et al. |
| 8,666,583 | B2 | 3/2014 | Tashiro |
| 8,763,577 | B2 | 7/2014 | Beckmann et al. |
| 8,863,870 | B2 | 10/2014 | Gwozdek et al. |
| 2010/0280698 | A1 | 4/2010 | Ichikawa |
| 2010/0140246 | A1 | 6/2010 | Grider et al. |
| 2014/0070013 | A1* | 3/2014 | Stanek ............... B60H 1/00 237/28 |
| 2015/0028019 | A1* | 1/2015 | Kamachi ............ B60H 1/2218 219/484 |
| 2015/0280489 | A1 | 10/2015 | Curlett |
| 2016/0059733 | A1* | 3/2016 | Hettrich ............... H04W 4/029 701/2 |
| 2017/0210390 | A1* | 7/2017 | Porras ............... B60K 6/40 |

\* cited by examiner

SYSTEMS AND METHODS FOR CHARGING AND WARMING VEHICLE COMPONENTS

BACKGROUND

Field

The present disclosure relates to systems and methods for charging and warming vehicle components and, more particularly, to systems and methods for providing energy to vehicle batteries, battery heaters and engine heaters using a single connection to a power source.

Description of the Related Art

Vehicles are in use throughout the world from tropical islands to Siberia and everywhere in between. Drivers in most locations can park and later restart their cars without any preparation in between. Drivers of vehicles in extreme temperatures, however, must prepare in order to be able to start their car after it has been parked for a period of time. For example, in some parts of Alaska, the ambient temperature is so low in the winter that an engine of a vehicle must be warmed before it will start. Many drivers in these locations purchase engine heaters for this purpose. The engine heaters are typically plugged into a power source, such as an outlet, and positioned near the engine. The heaters convert electrical energy into thermal energy (heat), which warms the engine due to their proximity to each other.

Electric vehicles and hybrid vehicles are becoming more and more popular. Electric vehicles typically include at least one motor-generator and at least one battery. Hybrid vehicles typically include at least one motor-generator, at least one battery and an engine. Batteries for these vehicles may be charged using an electric vehicle supply equipment device (EVSE) that is coupled to a power source. Batteries, like engines, may not function properly at extreme temperatures. In particular, the storage capacity of batteries decreases as the temperature decreases, so they may lose stored energy at or below a predetermined temperature. Furthermore, the batteries may not properly discharge energy at or below certain temperatures. Performance of other components, such as oil pans or transmission pans, may also be reduced in extreme temperatures.

Drivers of electric vehicles and hybrid vehicles who live in extreme temperatures cannot prepare their car for driving with an engine heater alone. For example, a driver of a plug-in hybrid vehicle must have an EVSE, a battery heater and an engine heater to prepare the vehicle for driving. This can present a problem if a driver has a limited number of electric sockets connecting to the EVSE and heaters. Furthermore, use of all of these external devices can cause undesirable clutter in a driver's garage.

Thus, there is a need for systems and methods for powering and warming vehicle components using a single device.

SUMMARY

Described herein is a system for distributing power from an external power source to two or more components of a vehicle. The system is especially beneficial for vehicles that are parked in extremely cold conditions. The system includes an on-board charger that receives energy from the external power source. The system also includes a battery coupled to the on-board charger. The battery stores energy. The battery has a state of charge (SOC) and a battery temperature. The system also includes a battery heater coupled to the battery and to the on-board charger. The battery heater converts electrical energy into thermal energy (heat) for increasing the battery temperature. The system also includes a battery management system (BMS) coupled to the battery. The BMS determines or detects a current SOC of the battery and a current battery temperature. The system also includes an electronic control unit (ECU) coupled to the on-board charger and to the BMS. The ECU controls the on-board charger to distribute energy to the battery and to the battery heater to cause the SOC to remain above a SOC threshold and to cause the battery temperature to remain above a battery temperature threshold based on the current SOC and the current battery temperature.

Also described is a system for distributing power from an external power source to two or more components of a vehicle. The system includes a power receiving port coupled to the external power source. The power receiving port receives energy from the external power source. The system also includes an engine having an engine temperature. The system also includes an engine temperature sensor coupled to the engine that detects the engine temperature. The system also includes an engine heater coupled to the power receiving port and to the engine heater. The engine heater converts electrical energy into heat for increasing the engine temperature. The system also includes an electronic control unit (ECU) coupled to the power receiving port and to the engine temperature sensor. The ECU determines when the power receiving port is coupled to the external power source. The ECU also controls the power receiving port to transmit energy to the engine heater to cause the engine temperature to remain at or above a first engine temperature threshold corresponding to a minimum desired engine temperature between when the power receiving port is coupled to the external power source and a departure time and to cause the engine temperature to be at or above a second engine temperature threshold that is greater than the first engine temperature threshold at the departure time of the vehicle based on a current engine temperature.

Also described is a method for distributing power from an external power source to vehicle components. The method includes receiving, from a battery management system (BMS), a current SOC of a battery and a current battery temperature of the battery. The method also includes receiving, from an engine temperature sensor, a current engine temperature of an engine. The method also includes controlling, by an electronic control unit (ECU), an on-board charger that is coupled to the external power source to transfer energy from the external power source to the battery to cause the SOC to remain at or above a first SOC threshold based on the current SOC. The method also includes controlling, by the ECU, the on-board charger to transfer energy from the external power source to a battery heater to cause a battery temperature to remain at or above a first battery temperature threshold based on the current battery temperature. The method also includes controlling, by the ECU, the on-board charger to transfer energy from the external power source to an engine heater to cause an engine temperature to remain at or above a first engine temperature threshold based on the current engine temperature.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Described herein are systems and methods for charging and heating vehicle components when the vehicles are parked in extreme temperature environments. The systems and methods provide benefits and advantages such as transferring energy from an external power source to multiple vehicle components using a single connection, such as a cable. This provides benefits and advantages such as allowing drivers to charge their vehicles and ensure that the vehicles are always prepared for departure in extreme temperatures by making the single connection between the external power source and the vehicle. The systems and methods provide further benefits and advantages such as providing power to vehicle components based on a predicted or received departure time and energy costs, allowing the components to receive more energy during low cost periods. This provides benefits and advantages such as reducing a total cost of energy. The systems and methods provide further benefits and advantages such as controlling energy distribution to component heaters based on predicted temperature increases, further increasing energy efficiency.

An exemplary system includes a power source that is external to the vehicle. The system also include a vehicle on-board charger that can be coupled to and receive power from the power source. The system also includes a battery and a battery management system (BMS) coupled to the battery. The BMS can detect a current state of charge (SOC) and a current temperature of the battery. The system also includes a battery heater coupled to the battery and to the vehicle on-board charger and that converts electrical energy into thermal energy (heat) for warming the battery. The system also includes an engine, an engine temperature sensor for detecting a current temperature of the engine and an engine heater coupled to the engine and to the vehicle on-board charger and that converts electrical energy into heat for warming the engine. The system also includes an ECU coupled to the vehicle on-board charger, the BMS, the battery heater, the engine temperature sensor and the engine heater. The ECU can determine or predict a departure time of the vehicle. The ECU controls distribution of power from the vehicle on-board charger to the battery, the battery heater and the engine heater based on the current SOC, the current battery temperature, the current engine temperature and the departure time.

Figure 1:
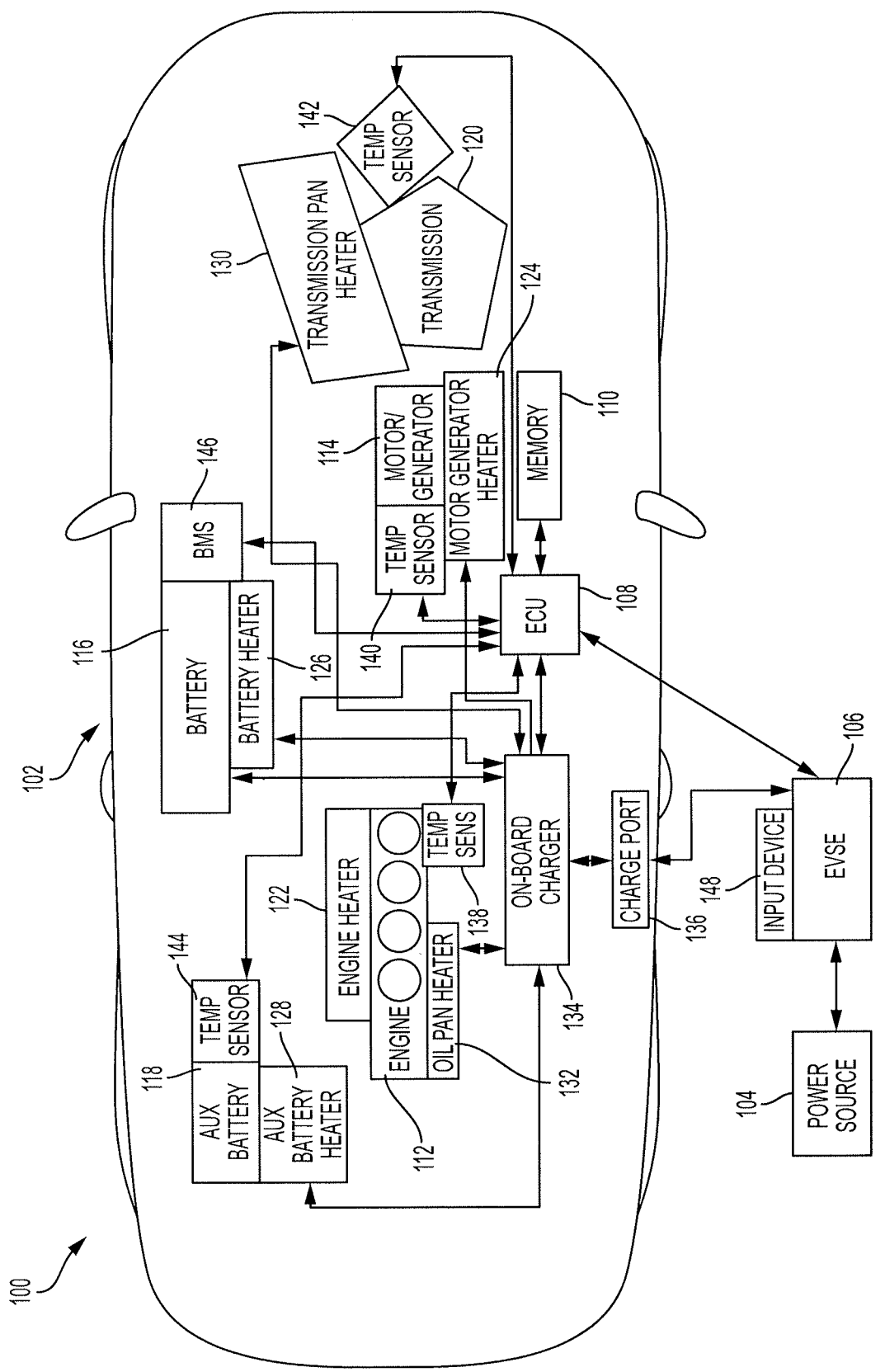
FIG. 1 is a block diagram of a vehicle for use in extreme temperatures and being designed to efficiently transfer energy from a power source to multiple vehicle components using a single connector according to an embodiment of the present invention.

Turning to FIG. 1, a system 100 is designed to provide power to vehicle batteries, battery heaters and engine heaters during electric charging. The system 100 includes a vehicle 102, a power source 104 and an electric vehicle supply equipment device (EVSE) 106. The power source 104 may include any power source capable of providing energy, such as a wall outlet. The EVSE 106 is coupled to a power source and transfers energy from the power source 104 to the vehicle 102 for charging a battery 116 of the vehicle 102.

The vehicle 102 may include an ECU 108, a memory 110, an engine 112, a motor-generator 114, the battery 116, an auxiliary battery 118 and a transmission 120. Although the vehicle 102 is shown to be a plug-in hybrid vehicle, one skilled in the art will realize that the present disclosure applies to any other vehicle configuration without departing from the scope of the invention.

The ECU 108 can include one or more processors or controllers, which may be specifically designed for automotive systems. The functions of the ECU 108 can be implemented in a single ECU or in multiple ECUs. The ECU 108 may receive data from components of the vehicle 102, may make determinations based on the received data and may control the operation of components based on the determinations.

The memory 110 may include any non-transitory memory known in the art. In that regard, the memory 110 may store machine-readable instructions usable by the ECU 108 and may store any other data as requested by the ECU 108.

The engine 112 converts fuel into mechanical power. In that regard, the engine 112 may be a gasoline engine, a diesel engine, a fuel cell engine or the like. The motor-generator 114 converts energy stored in the battery 116 and/or in the auxiliary battery 118 to mechanical power. The motor-generator 114 may also convert received mechanical power into energy to be stored in the battery 116.

The transmission 120 may receive torque from the engine 112 and/or the motor-generator 114. The transmission 120 can change an amplitude and rotational speed of the received torque and apply the output torque to wheels (not shown) of the vehicle 102.

The vehicle 102 may be driven and stored in extreme temperature environments. In that regard, it is desirable for the system 100, or the vehicle 102, to include heaters for at least some components. In the embodiment illustrated in FIG. 1, the vehicle 102 includes a number of heaters. In some embodiments, some or all of the heaters may be provided with the system 100 instead of the vehicle 102. In some embodiments, a vehicle or system may include greater or fewer heaters than shown in FIG. 1.

In particular, the vehicle 102 includes an engine heater 122, a motor-generator heater 124, a battery heater 126, an auxiliary battery heater 128, a transmission pan heater 130 and an oil pan heater 132. The heaters can include any type of heater capable of converting electrical energy into heat for warming their associated components. For example, the engine heater 122 may be a block heater and the battery heater 126 may be a high voltage battery warmup system or the like.

An on-board charger 134 is coupled to the battery 116 and configured to transfer energy to the battery 116 to increase a SOC of the battery 116.

Each of the heaters and the battery 116 operate based on received energy. In some embodiments, energy from the battery 116 may be used to power the heaters. In these embodiments, the energy used from the battery 116 should be replenished by the on-board charger 134 prior to departure of the vehicle 102.

The vehicle 102 further includes a charge port 136 that can be coupled to, and receive power from, the EVSE 106. The on-board charger 134 is electrically coupled to the charge port 136 such that power can be received by the on-board charger 134 from the charge port 136.

The on-board charger 134 may be coupled to each of the engine heater 122, the motor-generator heater 124, the battery heater 126, the auxiliary battery heater 128, the transmission pan heater 130, the oil pan heater 132 and the battery 116. The on-board charger 134 can transfer energy from the EVSE 106, via the charge port 136, to each of the heaters and the battery 116.

The power source 104 may have a power rating corresponding to a maximum amount of power that can be safely drawn therefrom. Thus, it may not be desirable for the on-board charger 134 to transfer energy to all heaters and the battery 116 at once, as this power draw may damage the power source 104. Furthermore, it is inefficient to continuously provide energy to the heaters and the battery 116 as the components may be sufficiently charged and warmed without continuous operation.

The ECU 108 is coupled to the on-board charger 134 and is designed to control the distribution of energy from the on-board charger 134 to the heaters and to the battery 116 in a safe and efficient manner. Control of the energy distribution may be at least partially based on a feedback system. In that regard, the ECU 108 may be coupled to temperature sensors or other sensors or devices for providing a current state of the components. In particular, the ECU 108 may be coupled to an engine temperature sensor 138, a motor-generator temperature sensor 140, a transmission temperature sensor 142 and an auxiliary battery temperature sensor 144.

The temperature sensors may be coupled to the corresponding vehicle component and provide a current temperature of the corresponding component. In particular, the engine temperature sensor 138 may be coupled to the engine 112 and detect a current temperature of the engine 112. In some embodiments, the engine temperature sensor 138 may include multiple sensors and be capable of detecting a temperature of the oil pan (not shown). The motor-generator temperature sensor 140 may be electrically and/or mechanically coupled to the motor-generator 114 and detect a current temperature of the motor-generator 114. The transmission temperature sensor 142 may be electrically and/or mechanically coupled to the transmission 120 and detect a current temperature of the transmission pan (not shown). The auxiliary battery temperature sensor 144 may be electrically and/or mechanically coupled to the auxiliary battery 118 and detect a current temperature of the auxiliary battery 118.

The ECU 108 may also be coupled to a BMS 146. The BMS 146 may measure, using battery sensors (not shown), parameters used to determine the SOC and the current temperature of the battery 116. The SOC may be a percentage or a ratio relative to another predetermined value associated with the battery 116 and may correspond to a level of energy stored in the battery 116. The ECU 108 may receive a current SOC and a current battery temperature from the BMS 146 and may use this information as feedback for controlling the distribution of energy.

Notably, all heaters and the battery 116 can receive energy from a single connection between the EVSE 106 and the charge port 136. For example, a single cable may be connected to the EVSE 106 and may be inserted into the charge port 136 when the vehicle 102 is parked. In some embodiments, the connection between the EVSE 106 and the charge port 136 may be wireless. In that regard, a connection is made between the EVSE 106 and the charge port 136 when the vehicle 102 is within a predetermined distance of the EVSE 106.

The ECU 108 controls when and how much energy is transferred to each of the heaters and the battery 116. Thus, a driver may simply connect the EVSE 106 to the charge port 136 upon parking the vehicle 102. The ECU 108 will control energy distribution from the on-board charger 134 such that all components of the vehicle 102 will be ready for departure.

It may be desirable for temperatures of components to always stay above a first threshold temperature, or a storage threshold temperature, and raise above a second threshold temperature, or a departure threshold temperature, prior to departing for a trip.

For example, the engine 112 and/or the motor-generator 114 may perform optimally when above their corresponding departure threshold. Similarly, the engine 112 and/or the motor-generator 114 may not function, or may function poorly, below their corresponding storage threshold. Similarly, the capacity of the battery 116 may decrease when its temperature is below the departure threshold, and the battery may not discharge when its temperature is below the storage threshold.

The battery 116 may have a third threshold temperature corresponding to a charging threshold. The charging threshold corresponds to a temperature above which it is desirable to charge the battery 116. The departure threshold of the battery 116 may correspond to a maximum safe battery storage threshold. In some embodiments, the departure threshold of the battery 116 may be the maximum state of charge (SOC) for the battery 116. The storage threshold may correspond to a minimum safe battery storage threshold. In some embodiments, the storage threshold of the battery 116 may be the minimum charge allowable for the battery 116.

Causing the temperatures (and SOC) of these components to stay above the departure threshold at all times may be inefficient. In that regard, the ECU 108 may control the on-board charger 134 to distribute energy so that the SOC and temperatures remain above the storage threshold and only rise to the departure threshold shortly prior to the departure time. In order to function in this manner, the ECU 108 may be capable of determining a departure time of the vehicle 102.

In some embodiments, the EVSE 106 may be coupled to, or include, an input device 148. A driver may provide a departure time to the EVSE 106 using the input device 148, such as when the driver connects the EVSE 106 to the charge port 136. The EVSE 106 may then transmit the departure time to the ECU 108. In some embodiments, the vehicle 102 may include an input device for receiving a departure time from a driver.

The ECU 108 may receive a departure time from a driver via any other method. For example, the vehicle 102 may include an input/output port (not shown) capable of receiving a signal that indicates the departure time from a driver's mobile device. In some embodiments, the vehicle 102 may receive a calendar of the driver from the cloud or a mobile device and determine when the driver needs to depart for each appointment. The ECU 108 may then estimate that the departure time corresponds to the time that the driver must depart to make the appointment.

In some embodiments, the EVSE 106 may be capable of predicting a departure time based on previously detected data. For example, the ECU 108 may detect and store departure times over a period of time. By analyzing the stored departure times, the ECU 108 may be capable of determining departure times based on a time of day, a day of the week or the like.

In some embodiments, the ECU 108 may also control energy distribution based on the cost of energy. For example, the ECU 108 may receive a schedule indicating costs of energy at various times throughout the day. This schedule may be received from the EVSE 106, the cloud or the like. The ECU 108 may then control energy distribution by causing the on-board charger 134 to distribute more energy during low cost times.

The ECU 108 may also control energy distribution based on predicted temperatures. For example, the ECU 108 may restrict heat transfer from heaters until an ambient temperature has increased to a point in which warming a component is more efficient. In some embodiments, the ECU 108 may include an ambient temperature sensor for detecting current temperatures of the environment of the vehicle 102 and may store the ambient temperatures. The ECU 108 may then learn the temperature patterns by analyzing the stored temperature data. In some embodiments, the ECU 108 may receive temperature forecast data, such as from a mobile device or the cloud.

In some embodiments, a vehicle may not be electric or hybrid and may thus have an engine and a traditional vehicle battery. In that regard, the vehicle may include an engine heater and/or a battery heater. The vehicle may include a power receiving port that functions in a similar manner as the on-board charger but does not provide energy to the battery. The ECU may control the distribution of energy by the power receiving port to the engine heater and the battery heater.

Figure 2:
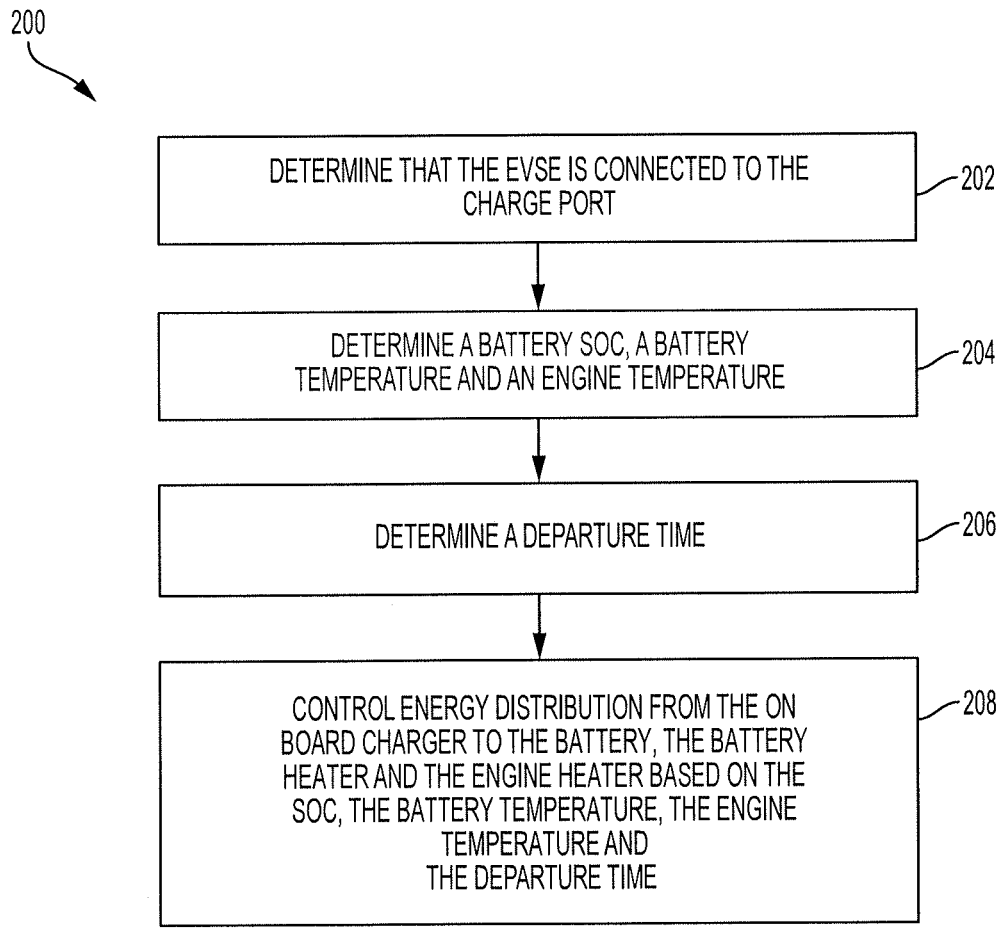
FIG. 2 is a block diagram illustrating a method for efficiently transferring energy from a power source to multiple vehicle components according to an embodiment of the present invention.

Referring briefly to FIGS. 1 and 2, a method 200 for controlling power distribution from an EVSE, such as the EVSE 106, to components of a vehicle, such as the vehicle 102, is shown. In particular, the method 200 may be performed by an ECU, such as the ECU 108, and can control power distribution to a battery of a vehicle, a battery heater of the vehicle and an engine heater of the vehicle. A method similar to the method 200 may be used to control power distribution to any number of components for any type of vehicle.

Turning to FIG. 2, the ECU may determine that the EVSE is connected to the charge port of the vehicle in block 202. The charge port may be capable of detecting whether it is connected to an EVSE. The charge port can then transmit a signal to the ECU indicating that the charge port is connected. In some embodiments, a sensor may be coupled to the charge port and detect the presence of the connection between the charge port and the EVSE and transmit this information to the ECU. In some embodiments, the on-board charger can communicate with the ECU and inform the ECU when the EVSE is connected to the charge port.

In block 204, the ECU may determine current temperatures of the vehicle components and the current SOC of a battery. For example, the ECU may receive temperature information from the temperature sensors that are coupled to the components, such as an engine temperature sensor. The ECU may also receive the SOC of the battery and the battery temperature from a BMS that is coupled to the battery.

In block 206, the ECU may determine a departure time of the vehicle. In some embodiments, the ECU may predict a departure time using route prediction. In some embodiments, a driver may input a destination time using an input device of the vehicle, an input device of the EVSE or another input device. In some embodiments, the ECU may sync with a driver's calendar and predict departure times based on events on the calendar.

In block 208, the ECU may control power distribution from the on-board charger to the various heaters and to the battery. The power distribution control may be based on current temperatures of the components, the SOC of the battery and the departure time.

Figure 3A:
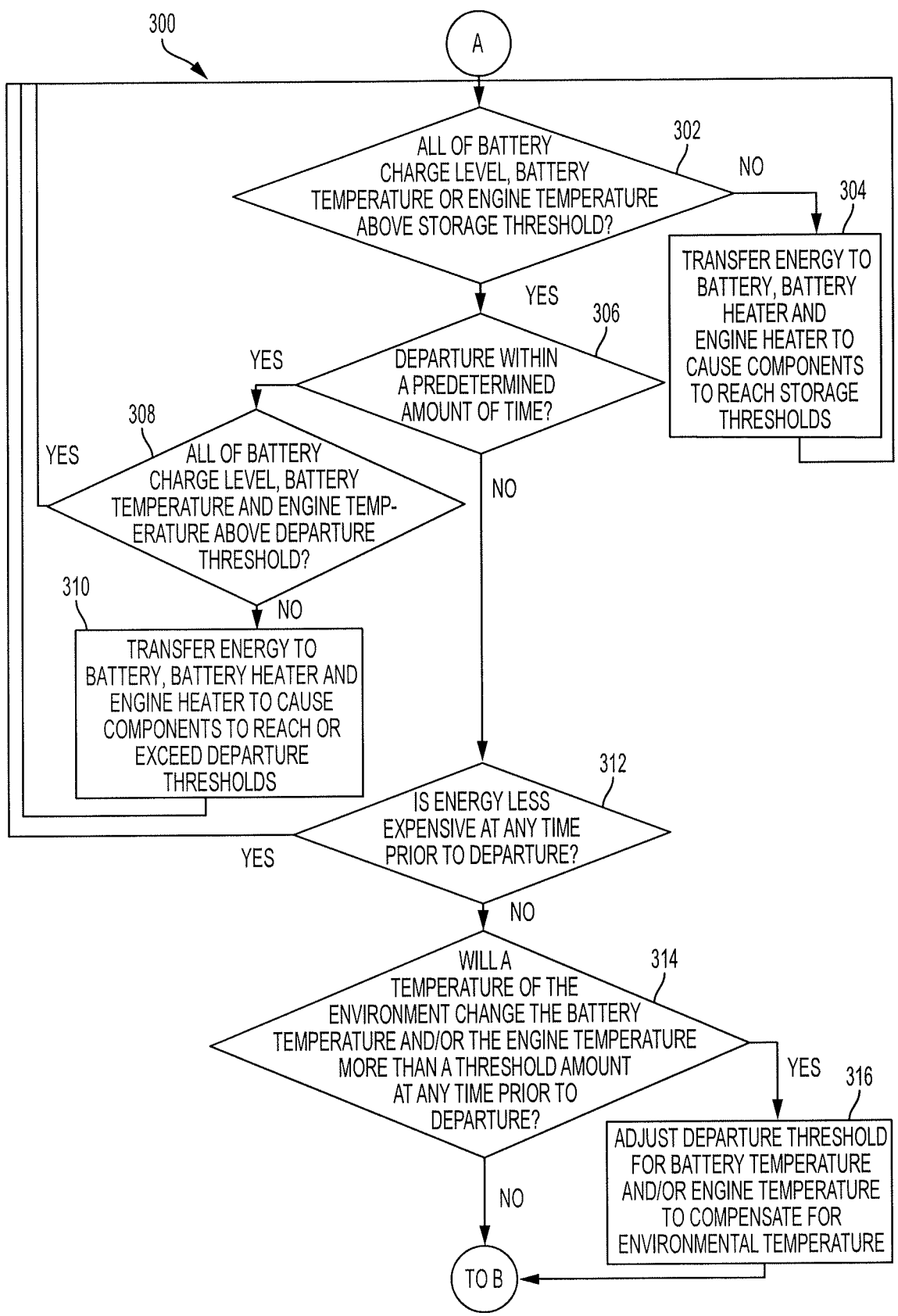
FIGS. 3A and 3B show a flowchart illustrating a method for controlling power distribution from an on-board charger to a battery, a battery heater and an engine heater based on a current SOC, a current battery temperature, a current engine temperature and a departure time according to an embodiment of the present invention.
Figure 3B:
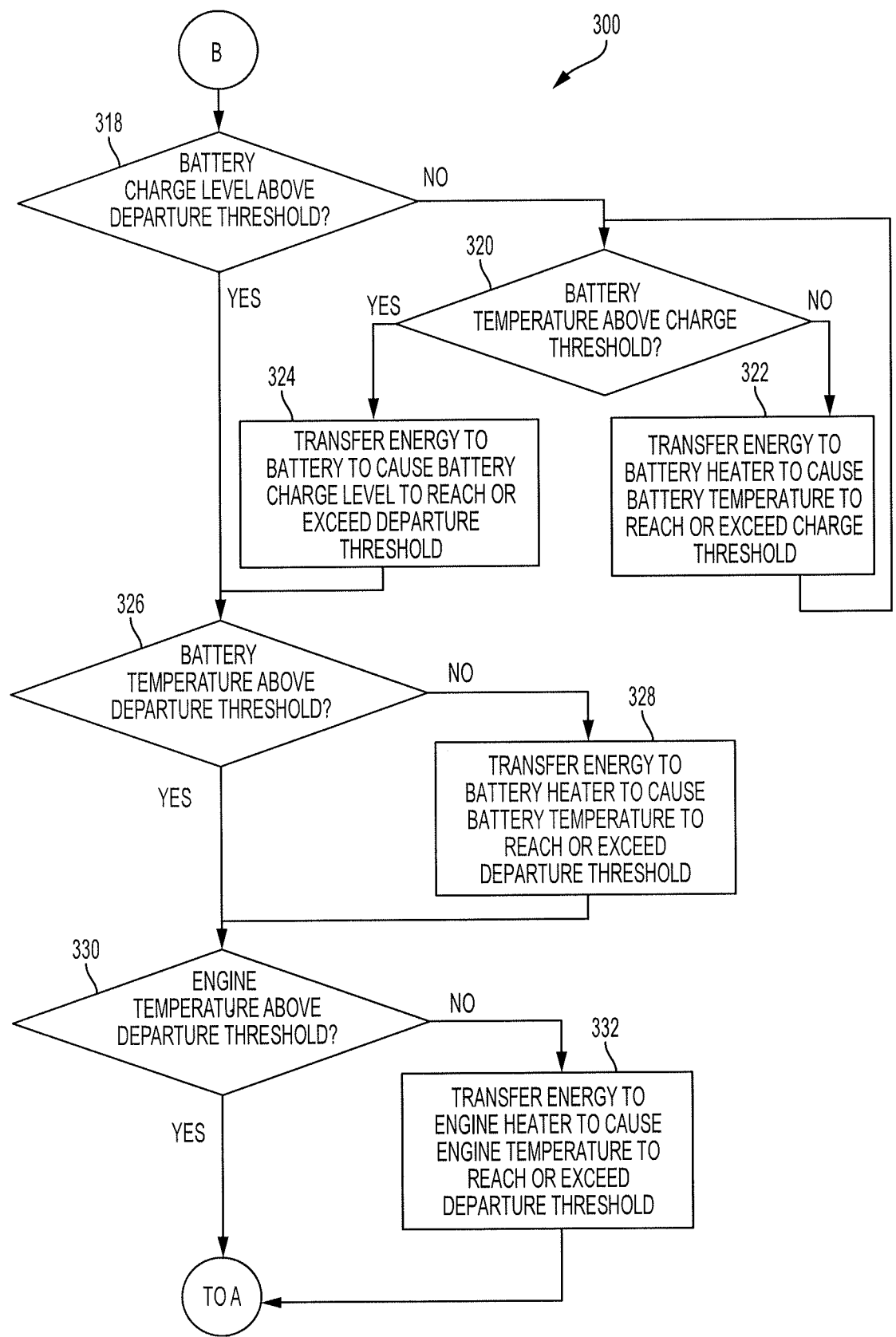

Turning now to FIGS. 3A and 3B, a method 300 for controlling power distribution from the on-board charger to the various heaters and to the battery is shown. In block 302, the ECU may determine whether each of the battery SOC, the battery temperature and the engine temperature is above the storage threshold. As described above, it is desirable for each of these values to remain above the storage threshold at all times. If one or more of these values is below the storage threshold, the method 300 may proceed to block 304.

In block 304, the ECU may cause the on-board charger to draw power from the EVSE and transfer it to the component or components that are below the storage threshold. For example, if the engine temperature is below the storage threshold, the ECU may cause the engine heater to receive energy in order to heat up the engine. If the battery SOC is below the battery charge threshold, the ECU may cause the battery to receive power. In some embodiments, it may be desirable for the battery to be heated to the charge threshold prior to receiving charge. In these embodiments, the ECU may cause energy to be provided to the battery heater to cause the battery temperature to be at or above the charge threshold temperature prior to charging the battery.

If more than one component is below the storage threshold, the ECU may cause the energy to be distributed in one of a plurality of manners. In some embodiments, if the ECU determines that the battery temperature and the engine temperature are below the storage threshold, the ECU may select one of the battery heater or the engine heater and control it to receive energy to heat the corresponding component to or above the storage threshold prior to providing energy to the other of the battery heater or the engine heater.

In some embodiments, the ECU may concurrently cause each of the battery heater and the engine heater to receive energy. The amount of energy received by each may be determined based on the power rating of the power source, the EVSE, the charge port, the on-board charger or the like and controlled by the ECU. For example, the ECU may divide the power rating of the power source in half and use half to power the battery heater and half to power the engine heater.

In some embodiments, the ECU may cause the battery heater and the engine heater to receive energy in cycles. For example, the ECU can cause the battery heater to receive energy for 5 minutes then the engine heater to receive energy for 5 minutes and so forth.

After distributing energy, the ECU will again determine if the battery SOC, the battery temperature and the engine temperature are each above the storage threshold. If so, the ECU may determine whether the departure is within a predetermined amount of time of the current time in block 306.

The predetermined amount of time may correspond to an amount of time required for each of the temperatures and the SOC to reach or exceed the departure threshold from the storage threshold. For example, it may take 15 minutes for each of the SOC, the battery temperature and the engine temperature to reach the departure threshold from the storage threshold. In this case, the predetermined amount of time will be approximately 45 minutes.

In some embodiments, the ECU may dynamically determine the predetermined amount of time such that it corresponds to an amount of time required for each of the component values to reach or exceed the departure threshold from the current values. For example, it may take no time for the SOC to reach the departure threshold, 5 minutes for the battery temperature to reach the departure threshold and 15 minutes for the engine temperature to reach the departure threshold. In this case, the predetermined amount of time will be 20 minutes instead of 45 minutes.

In some embodiments, the ECU may add a time buffer to the predetermined amount of time. For example, the ECU may add a time buffer to the predetermined amount of time. The time buffer may be a constant value, such as 10 minutes. The time buffer may also be a percentage of the predetermined amount of time, such as 25% of the predetermined amount of time. The time buffer may also be calculated by the ECU. For example, the ECU may calculate the time buffer based on previously detected data regarding the time differential between the driver's planned departure and actual departure.

In some embodiments, the ECU may not know the departure time. In these embodiments, the ECU may learn times at which the vehicle is not driven. For example, the driver may have never driven the vehicle between 12 am and 5 am. In this example, the ECU may determine that the departure time is 5 am. In some embodiments, the ECU may control the on-board charger to distribute energy so that each component is always near, at or above the departure threshold. For example, the ECU may control the on-board charger so that each component is within 10 percent (10%) of the departure threshold at any given time.

If the departure time is within the predetermined amount of time, the ECU determines whether all of the SOC, the battery temperature and the engine temperature are above the departure threshold in block 308. If so, the method returns to block 302. If not, the ECU may transfer energy to the battery, the battery heater and the engine heater to cause the components to be heated to or above the departure threshold in block 310.

The ECU may cause the components to reach the departure thresholds in a similar manner as causing them to reach the storage thresholds in block 304. For example, it can cause the on-board charger to provide power to only the components that are below the departure threshold. If two or more components are below the departure threshold, the ECU can cause the on-board charger to provide power to each of them simultaneously or can cycle between them. Similarly, the ECU may ensure that the battery temperature is at or above the charge threshold prior to charging the battery.

The functions of the ECU that are performed in block 310 are in preparation for an upcoming departure. It is conceivable that sufficient time is not available to cause each component to reach the departure threshold due to, for example, the driver departing early. Therefore, in some embodiments, the ECU may assign a priority to each component value. For example, the ECU may assign a first priority to the SOC, a second priority to the battery temperature and a third priority to the engine temperature. If the vehicle is an electric vehicle, the SOC may have the highest priority, meaning it will be increased to the departure threshold first. If the vehicle is a hybrid vehicle, the engine may have the highest priority, the SOC may have the second highest and the battery temperature may have the lowest.

In some embodiments, if the vehicle is a hybrid vehicle, the ECU may determine priorities based on a fuel level and/or SOC of the vehicle. If the fuel level is high, the ECU may ensure that the engine temperature is increased to the departure threshold first. If the fuel level is low and the SOC is high, on the other hand, the ECU may ensure that the SOC reaches the departure threshold first. In some embodiments, the ECU may cause each of the SOC and the engine temperature to simultaneously receive as much energy as possible in the remaining time.

It is desirable to reduce costs where possible. Thus, if departure is not within a predetermined amount of time in block 306, then the method may proceed to block 312 where the ECU determines whether energy costs will be lower at a future time before departure.

The ECU may obtain energy cost information in one of many ways. For example, the ECU may download or be provided with energy cost information that indicates the cost of energy at any given day and/or time. In some embodiments, the ECU may receive current and/or future cost data via a connection with the cloud. In some embodiments, the ECU may receive current and/or future cost data from the EVSE.

If energy will be less expensive at another time prior to departure, the method 300 may return to block 302. However, in some embodiments, the ECU may ensure that the duration of low energy costs is sufficient such that the requisite energy can be obtained during that time. If not, the ECU may calculate how much additional time would be required for the components to reach the departure thresholds if energy is received during the entire low cost period. The ECU may then instruct the on-board charger to receive and distribute energy for this additional amount of time prior to the low cost period beginning and/or may instruct the on-board charger to receive and distribute this additional energy after the low cost period has ended.

Occasionally, the temperature of the environment of the vehicle may change enough to affect the temperatures of the engine and the battery. As another cost-saving measure, the ECU may account for this temperature change when determining energy distribution. Thus, if the energy will not be less expensive prior to departure, the ECU may determine whether an ambient temperature of the environment will be sufficient to change the battery temperature and/or the engine temperature more than a threshold amount at any time prior to departure in block 314. For example, an ambient temperature may rise above the departure threshold of the engine temperature and/or of the battery temperature. This increased temperature may be sufficient to cause the engine temperature and/or the battery temperature to increase at least partially towards the departure thresholds. In that regard, it is undesirable to heat the engine and/or battery using energy when they will be heated by the environment prior to departure.

If the temperature will increase the battery temperature and/or the engine temperature prior to departure, the ECU may adjust the departure threshold for the battery temperature and/or for the engine temperature. This adjustment may compensate for the upcoming change in ambient temperature. For example, the departure threshold for the engine temperature may be 15 degrees Fahrenheit (F) and the departure time may be 10 am. The current ambient temperature may be negative 5 (−5) degrees F. at 7 am and may increase to 25 degrees F. by 10 am. The ECU may determine that the increase in ambient temperature will increase the engine temperature by 5 degrees F. The ECU may then set the departure threshold to 20 degrees F. as the ambient temperature will provide the additional 5 degrees F.

In some embodiments, the ECU may incorporate changes in ambient temperatures in other manners. For example, the ECU may not adjust the departure thresholds but may instruct the on-board charger to distribute less power to heaters than it would otherwise. In some embodiments, the ECU may not make decisions based on ambient temperatures.

As shown in FIG. 3B, the method 300 continues at block 318. The SOC, battery temperature and engine temperature are shown in a particular order with the SOC having a higher priority than the battery temperature or the engine temperature. Furthermore, each component receives energy at separate times.

In some embodiments, two or more components can receive energy at any given time. For example, each component may receive energy at the same time. When one component has reached the departure threshold, it may no longer receive energy and the amount of energy provided to the other components may increase.

In some embodiments, energy may be provided to components in any order. For example, it may be provided to the engine heater first, then to the battery heater and finally to the battery.

In block 318, the ECU may determine whether the SOC is at or above the departure threshold. For example, the ECU may compare the current SOC to the departure threshold.

If the SOC is not above the departure threshold, the ECU may determine whether the battery temperature is above the charge threshold in block 320. If the battery temperature is not above the charge threshold, charging of the battery may be inefficient. Thus, the ECU may transfer energy to the battery heater to cause the battery temperature to reach or exceed the charge threshold in block 322. Heating of the battery to the charge threshold prior to charging the battery increases the efficiency of the battery charging and increases the capacity of the battery.

After causing the battery heater to heat the battery, the ECU may return to block 320 to ensure the battery temperature is above the charge threshold. If the battery temperature is at or above the charge threshold, the ECU may cause the on-board charger to provide energy to the battery for charging the battery in block 324. In block 324, the ECU may cause the battery to be charged until its SOC reaches or exceeds the departure threshold.

In block 326, after the battery has been charged to the departure threshold, the ECU may determine whether the battery temperature is at or above the departure threshold. If the battery temperature is below the departure threshold, the ECU may control the on-board charger to provide energy to the battery heater in block 324. The ECU may cause the on-board charger to continue to provide energy to the battery heater until the battery temperature reaches or exceeds the departure threshold.

After the battery temperature has reached or exceeded the departure threshold, the ECU may determine whether the engine temperature is at or above the departure threshold in block 330. If the engine temperature is below the departure threshold, the ECU may cause the on-board charger to provide energy to the engine heater to increase the engine temperature in block 332. The ECU may cause the on-board charger to continue providing energy to the engine heater until the engine temperature reaches or exceeds the departure threshold.

In some embodiments, controlling the on-board charger to transfer energy to the battery, the battery heater and the battery temperature in block 304 and/or block 310 may be performed in a similar manner as discussed with reference to blocks 318 through 332.

In some embodiments, the energy from the on-board charger may be provided to the battery 116 alone and the ECU may control the transfer of energy from the battery to the battery heater and the engine heater.

Figure 4:
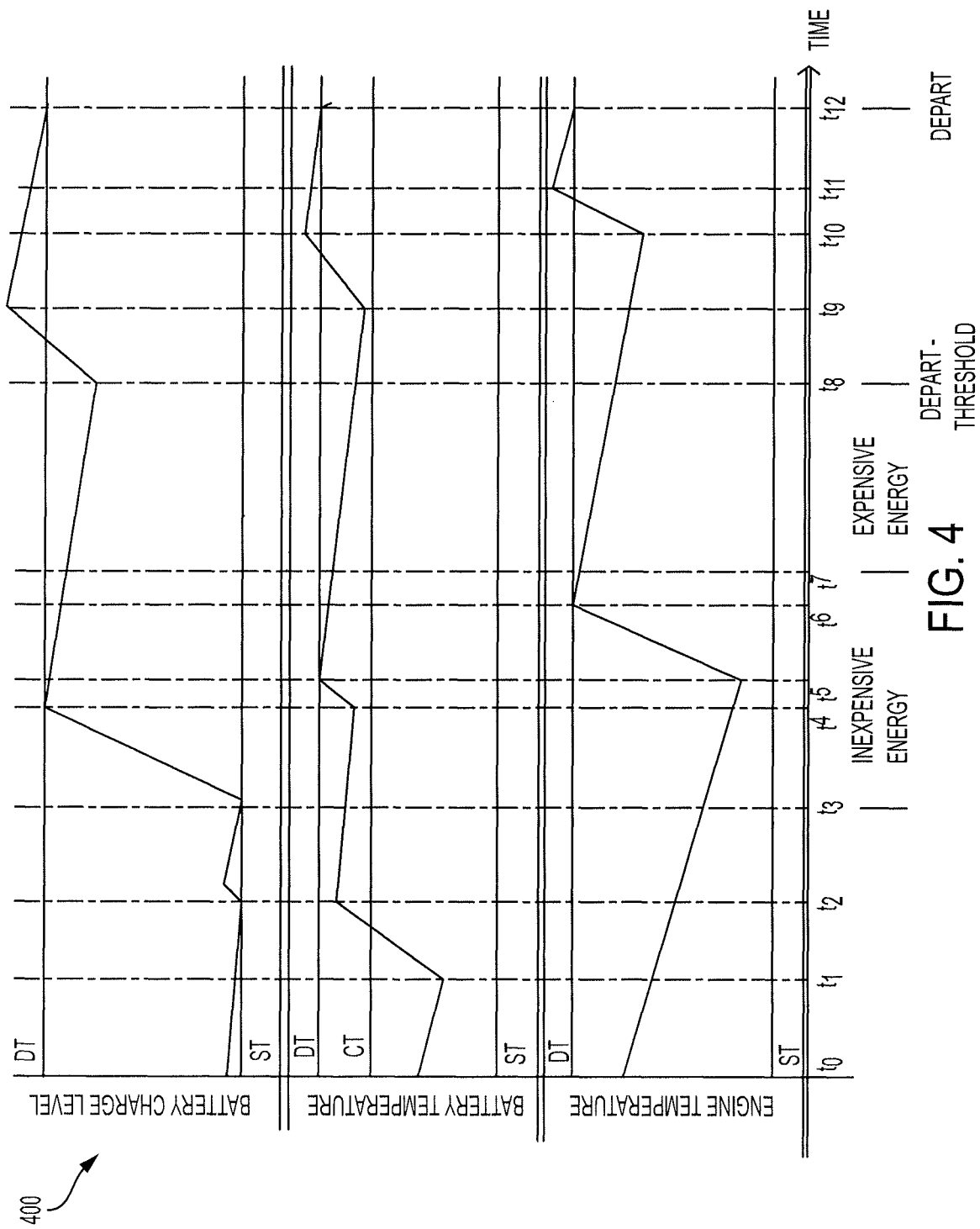
FIG. 4 is a time chart showing a battery SOC, a battery temperature and an engine temperature of a battery and an engine of a vehicle performing a method similar to the method of FIGS. 3A and 3B according to an embodiment of the present invention.

Turning now to FIG. 4, a time chart 400 illustrates a SOC, a battery temperature and an engine temperature over time. The SOC, battery temperature and engine temperature may correspond to a vehicle, such as the vehicle 102, having an ECU performing a method similar to the method 300 of FIGS. 3A and 3B.

Between times $t_0$ and $t_3$, the cost of energy may be relatively high and the departure time may be greater than an amount of time required to increase the component values from the storage threshold to the departure threshold. At time $t_1$, the ECU may determine that the SOC will reach the storage threshold at time $t_2$ and that the battery temperature is below the charge threshold. Thus, the ECU may instruct the on-board charger to provide energy to the battery heater to increase the battery temperature.

As shown at time $T_2$, the ECU has increased the battery temperature to a value above the charge threshold. Also at time $t_2$, the ECU instructs the on-board charger to transmit energy to the battery. Thus, the SOC increases to a value above the storage threshold shortly after time $t_2$.

The ECU may also determine that the cost of energy will be reduced at time $t_3$. Thus, the ECU may only provide sufficient charge to the battery for it to remain above the storage threshold until time $t_3$. At time $t_3$, the ECU may instruct the on-board charger to provide power to the battery until the SOC reaches the departure threshold at time $t_4$.

After the SOC reaches the departure threshold, the ECU may control the on-board charger to provide energy to the battery heater until the battery temperature reaches the departure threshold at time $t_5$.

After the battery temperature reaches the departure threshold, the ECU may control the on-board charger to provide energy to the engine heater. Energy is provided to the engine heater until the engine temperature reaches the departure threshold at time $t_6$.

Between time $t_6$ and $t_7$, the on-board charger may not provide any energy to any components. In some embodiments, however, the ECU may cause the on-board charger to provide energy to one or more component between time $t_6$ and $t_7$ due to the reduced cost.

The cost of energy increases at time $t_7$. The departure time is at time $t_{12}$. Time $t_8$ is equal to the departure time minus the departure time threshold, corresponding to the amount of time required for the components to reach the departure thresholds from the current component values. Thus, between time $t_7$ and $t_8$, the on-board charger does not provide energy to any component.

At time $t_8$, the ECU begins controlling energy flow to the components to ensure that the component values are at or above the departure threshold values. In particular, between time $t_8$ and time $t_9$, the ECU controls the on-board charger to provide power to the battery. The ECU may cause the on-board charger to provide an amount of power to the battery for the SOC to be above the departure threshold. This allows the SOC to gradually reduce until the departure time and still be at or above the departure threshold at the departure time.

At time $t_9$, the ECU controls the on-board charger to provide power to the battery heater. The on-board charger provides energy to the battery heater until time $t_{10}$ when the battery temperature is above the departure threshold.

At time $t_{10}$, the ECU controls the on-board charger to provide power to the engine heater. The on-board charger provides energy to the engine heater until time $t_{11}$ when the engine temperature is above the departure threshold, allowing the engine temperature to decrease and still be at or above the departure threshold at the time of departure.

No energy is provided from the on-board charger between time $t_{11}$ and time $t_{12}$. Notably, the SOC, the battery temperature and the engine temperature are each at or above the departure threshold at the time $t_{12}$ corresponding to the time of departure.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for distributing power from an external power source to two or more components of a vehicle, the system comprising:
    an on-board charger configured to receive energy from the external power source;
    a battery coupled to the on-board charger, configured to store energy and having a state of charge (SOC) and a battery temperature;
    a battery heater coupled to the battery and to the on-board charger and configured to convert electrical energy into thermal energy for increasing the battery temperature, the electrical energy received by the battery heater being received from the on-board charger and bypassing the battery;
    a battery management system (BMS) coupled to the battery and configured to determine or detect a present SOC of the battery and a current battery temperature; and
    an electronic control unit (ECU) coupled to the on-board charger and to the BMS and configured to:
        control the on-board charger to distribute energy to the battery and to the battery heater to cause the SOC to remain above a SOC threshold and to cause the battery temperature to remain above a storage battery temperature threshold based on the present SOC and the current battery temperature,
        determine a departure time corresponding to a time at which the vehicle will depart for a trip, the departure time being received from an input device, a remote device, a stored user calendar, or being determined based on previously detected data, and
        control the on-board charger to distribute energy to the battery heater to cause the battery temperature to reach or exceed a departure battery temperature threshold corresponding to a desired battery temperature at the departure time, the departure battery temperature threshold being greater than the storage battery temperature threshold.

2. The system of claim 1 wherein the SOC threshold is a SOC storage threshold corresponding to a minimum desired SOC value and the battery temperature threshold is a battery storage threshold corresponding to a minimum desired temperature value.

3. The system of claim 2 wherein the ECU is further configured to
    control the on-board charger to distribute energy to the battery to cause the SOC to reach or exceed a departure SOC threshold corresponding to a desired SOC at the departure time,
    wherein the departure SOC threshold is greater than the SOC storage threshold.

4. The system of claim 1 wherein the ECU is further configured to control the on-board charger to distribute energy to the battery heater to cause the battery temperature to rise above a battery charge threshold prior to distributing energy to the battery to increase the SOC.

5. The system of claim 1 further comprising:
    an engine having an engine temperature;
    an engine temperature sensor coupled to the engine and configured to detect the engine temperature; and
    an engine heater coupled to the on-board charger and to the engine and configured to convert electrical energy into heat for increasing the engine temperature,
    wherein the ECU is further configured to control the on-board charger to distribute energy to the engine heater to cause the engine temperature to remain above an engine temperature threshold.

6. The system of claim 1 further comprising:
    at least one of a transmission pan or an oil pan,
    a second temperature sensor configured to detect a temperature of the at least one of the transmission pan or the oil pan, and
    a second heater configured to convert electrical energy into heat for increasing a second temperature of the at least one of the transmission pan or the oil pan,
    wherein the ECU is further configured to control the on-board charger to distribute energy to the second heater to cause the second temperature to remain above a threshold temperature.

7. The system of claim 1 wherein the ECU is further configured to determine that a future cost of energy will be less than a current cost of energy during a time period between a current time and a departure time and to control the on-board charger to distribute energy to the battery and to the battery heater during at least a portion of the time period in order to reduce a total cost of energy.

8. The system of claim 1 further comprising a charge port coupled to the on-board charger and an electric vehicle supply equipment device (EVSE) coupled to the external power source and to the charge port and configured to transfer energy from the external power source to the charge port.

9. A system for distributing power from an external power source to two or more components of a vehicle, the system comprising:
    a power receiving port configured to receive energy from the external power source;
    a battery coupled to the power receiving port, configured to store energy and having a state of charge (SOC) and a battery temperature;
    a battery heater coupled to the battery and to the power receiving port and configured to convert electrical energy into thermal energy for increasing the battery temperature;
    a battery temperature sensor coupled to the battery and configured to detect a present battery temperature of the battery; and an electronic control unit (ECU) coupled to the power receiving port and to the battery temperature sensor and configured to:
control the power receiving port to distribute energy to the battery and to the battery heater to cause the SOC of the battery to remain above a SOC threshold and to cause the battery temperature to remain above a storage battery temperature threshold based on a present SOC of the battery and the present battery temperature of the battery,
determine a departure time corresponding to a time at which the vehicle will depart for a trip, the departure time being received from an input device, a remote device, a stored user calendar, or being determined based on previously detected data, and
control the power receiving port to distribute energy to the battery heater to cause the battery temperature to reach or exceed a departure battery temperature threshold corresponding to a desired battery temperature at the departure time, the departure battery temperature threshold being greater than the storage battery temperature threshold.

10. The system of claim 9 wherein the SOC threshold is a SOC storage threshold corresponding to a minimum desired SOC value and the battery temperature threshold is a battery storage threshold corresponding to a minimum desired temperature value.

11. The system of claim 10 wherein the ECU is further configured to:
control the power receiving port to distribute energy to the battery to cause the SOC to reach or exceed a departure SOC threshold corresponding to a desired SOC at the departure time,
wherein the departure SOC threshold is greater than the SOC storage threshold and the departure battery temperature threshold is greater than the battery storage threshold.

12. The system of claim 9 wherein the ECU is further configured to control the power receiving port to distribute energy to the battery heater to cause the battery temperature to rise above a battery charge threshold prior to distributing energy to the battery to increase the SOC.

13. A system for distributing power from an external power source to two or more components of a vehicle, the system comprising:
an on-board charger configured to receive energy from the external power source;
a battery coupled to the on-board charger, configured to store energy and having a state of charge (SOC) and a battery temperature;
at least one of a transmission pan or an oil pan;
a battery heater coupled to the battery and to the on-board charger and configured to convert electrical energy into thermal energy for increasing the battery temperature;
a battery management system (BMS) coupled to the battery and configured to determine or detect a present SOC of the battery and a current battery temperature;
a second temperature sensor configured to detect a temperature of the at least one of the transmission pan or the oil pan;
a second heater configured to convert electrical energy into heat for increasing a second temperature of the at least one of the transmission pan or the oil pan; and
an electronic control unit (ECU) coupled to the on-board charger and to the BMS and configured to:
control the on-board charger to distribute energy to the battery and to the battery heater to cause the SOC to remain above a SOC threshold and to cause the battery temperature to remain above a storage battery temperature threshold based on the present SOC and the current battery temperature,
determine a departure time corresponding to a time at which the vehicle will depart for a trip, the departure time being received from an input device, a remote device, a stored user calendar, or being determined based on previously detected data,
control the on-board charger to distribute energy to the battery heater to cause the battery temperature to reach or exceed a departure battery temperature threshold corresponding to a desired battery temperature at the departure time, the departure battery temperature threshold being greater than the storage battery temperature threshold, and
control the on-board charger to distribute energy to the second heater to cause the second temperature to remain above a threshold temperature.

14. The system of claim 13 wherein the SOC threshold is a SOC storage threshold corresponding to a minimum desired SOC value and the battery temperature threshold is a battery storage threshold corresponding to a minimum desired temperature value.

15. The system of claim 14 wherein the ECU is further configured to:
control the on-board charger to distribute energy to the battery to cause the SOC to reach or exceed a departure SOC threshold corresponding to a desired SOC at the departure time,
wherein the departure SOC threshold is greater than the SOC storage threshold.

16. The system of claim 13 wherein the ECU is further configured to control the on-board charger to distribute energy to the battery heater to cause the battery temperature to rise above a battery charge threshold prior to distributing energy to the battery to increase the SOC.

17. The system of claim 13 further comprising:
an engine having an engine temperature;
an engine temperature sensor coupled to the engine and configured to detect the engine temperature; and
an engine heater coupled to the on-board charger and to the engine and configured to convert electrical energy into heat for increasing the engine temperature,
wherein the ECU is further configured to control the on-board charger to distribute energy to the engine heater to cause the engine temperature to remain above an engine temperature threshold.

18. The system of claim 13 wherein the ECU is further configured to determine that a future cost of energy will be less than a current cost of energy during a time period between a current time and a departure time and to control the on-board charger to distribute energy to the battery and to the battery heater during at least a portion of the time period in order to reduce a total cost of energy.

19. The system of claim 13 further comprising a charge port coupled to the on-board charger and an electric vehicle supply equipment device (EVSE) coupled to the external power source and to the charge port and configured to transfer energy from the external power source to the charge port.

* * * * *